Patented Sept. 4, 1945

2,384,384

UNITED STATES PATENT OFFICE 2,384,384

POLYMERIC SILICONE AND METHODS OF MAKING IT

Rob Roy McGregor, Verona, and Earl L. Warrick, Pittsburgh, Pa., assignors to Corning Glass Works, Corning, N. Y., a corporation of New York No Drawing. Application February 26, 1942, Serial No. 432,530

8 Claims. (Cl. 260—607)

This invention relates to the preparation and use of liquids having lubricating properties and specifically characterized by high resistance to oxidation, little change of viscosity with temperature and low pour point, as determined by the A. S. T. M. standard method for lubricants.

The lubricants in common use are for the most part petroleum oils. While they have a wide range of use they have certain inherent defects which make them inapplicable or only poorly applicable under certain conditions. The most evident of these defects are their ease of oxidation or inflammability, instability at high temperature as evidenced by acid formation and viscosity increase, inability to lubricate at low temperatures, and their great change of viscosity with change of temperature. Liquids which do not have these defects would be useful in fields where abnormal or subnormal temperatures are to be encountered or where high concentration of oxygen makes the use of petroleum oils hazardous, and the production of such liquid is the primary object of this invention.

Other objects will be perceived in the following description of our new liquids, their constitution, properties and uses and the methods by which they may be produced, all of which contribute to the various embodiments of our invention.

We have found that many desirable features rendering it suitable for the above mentioned and other purposes are possessed by an organo-silicon oxide of the class known as silicones, more specifically dimethyl silicone, which we believe has not heretofore been prepared and isolated in a pure state. In the chemical literature the term "silicone" refers to those silicon compounds, analogous to the ketones, in which two organic groups are combined with silicon and oxygen according to the general formula R$_2$SiO, R being an organic radicle. In other words, the silicones are di-organo silicon oxides. Inasmuch as silicon, unlike carbon, does not form a stable double bond with oxygen, the silicones in general are polymeric and their unit structure is

The term "silicone," as used herein, excludes the mono-organo silicon oxides in which only one organic radicle is attached to the silicon atom and which are highly polymeric and are represented by the unit structure

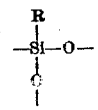

As a further distinction over instances where "methyl silicone" is used to include the mono-methyl compound, the term "dimethyl silicone" will be used herein to designate the substantially dehydrated compound (CH$_3$)$_2$SiO having the polymeric unit structure

The dimethyl silicone liquid produced by our method and comprising a mixture of the polymers thereof has an unusually low pour point and, when freed from its lowermost polymers by our method, it is remarkably resistant to further polymerization at elevated temperatures. For these reasons it maintains a relatively consistent viscosity throughout a wide range of temperatures and its change of viscosity with temperature is much less than is the case with hydrocarbon oils.

PREPARATION OF DIMETHYL SILICONE LIQUIDS

1. Pure dimethyl diethoxy silicane,

is prepared in accordance with the method described and claimed in our copending application Serial Number 416,285, filed October 23, 1941, which comprises reacting nascent methyl magnesium Grignard with ethyl orthosilicate,

under pressure and fractionally distilling the product. More specifically, one mol equivalent of metallic magnesium is added to one mol equivalent of ethyl orthosilicate in a pressure tight vessel. Methyl chloride gas is passed in until the ethyl orthosilicate is saturated therewith and a few cc. of ethyl bromide and a few crystals of iodine are then added to initiate the reaction, after which the reaction vessel is sealed and methyl chloride is again passed in until a total of one mol equivalent thereof has been added. At the same time the reaction mixture is stirred and heat and pressure are developed. After some time the temperature and pressure subside, indicating that the reaction has ceased, and the products of the reaction corresponding to the equation $$CH_3Cl + Si(OC_2H_5)_4 + Mg \rightarrow$$
$$(CH_3)Si(OC_2H_5)_3 + C_2H_5OMgCl$$
$$CH_3Cl + CH_3Si(OC_2H_5)_3 + Mg \rightarrow$$
$$(CH_3)_2Si(OC_2H_5)_2 + C_2H_5OMgCl$$

are fractionally distilled. The boiling point of the dimethyl diethoxy silicon is 112° C. and the separation from the other components of the mixture is relatively easy.

2. The pure dimethyl diethoxy silicane, preferably dissolved in ethyl alcohol, is hydrolyzed with water. The hydrolysis may be conducted in various ways and, although the resulting liquid will invariably have the same chemical composition, its chemical structure and the physical properties dependent thereon can be varied substantially. In general, the use of a catalyst for promoting hydrolysis and the use of heat during hydrolysis or during the subsequent drying of the product will increase its viscosity.

Preferably, hydrolysis is carried out in the presence of an acid catalyst by mixing one volume of the dimethyl diethoxy silicane with one volume of a mixture of 95% ethyl alcohol and concentrated aqueous hydrochloric acid in equal parts. Although any acid may be used, we prefer to use acids which are easily removed by washing or which are decomposed by heat, such as, hydrochloric, oxalic, acetic or trichloracetic acids. Any concentration of acid may be used and for a given acid the higher the concentration the higher the viscosity of the resulting liquid.

The temperature at which the hydrolysis is carried out will also affect the viscosity of the resulting liquid and the higher the temperature the higher the viscosity or the more speedily does the liquid attain a given viscosity. Hydrolysis may be effected at room temperature in about eighteen hours but, preferably, the reaction mixture is refluxed for about four to eight hours after which it is poured into water and the product separates. The oily layer is washed free from acid and alcohol and is thereafter dried.

Drying may be accomplished without the use of heat by treating the liquid at room temperature with a drying agent such as anhydrous sodium sulfate. When thus dried, the liquids which result from hydrolysis at room temperature have a viscosity of about 100 Saybolt seconds at 25° C. Liquids prepared without the use of a catalyst and without the application of heat will have still lower viscosities. If desired, the liquids may be dried and partially dehydrated by heating them at about 120° C., or over, preferably under reduced pressure whereby the viscosities may range from 200 to 1000 or more Saybolt seconds at 25° C., the viscosity increasing with time and/or temperature of drying. Control of viscosity by heating will be hereinafter more fully described.

Chemical Structure and Properties

The liquids prepared by the above described process are mixtures of dimethyl silicone polymers having the unit structure hereinbefore referred to. They are soluble in organic solvents such as benzene, toluene, etc. Analysis shows that they contain 37.7% silicon and 32.3% carbon, which corresponds to the ratio of two carbon atoms per silicon atom. The corresponding theoretical amounts for $(CH_3)_2SiO$ are 37.8% Si and 32.4% carbon.

We have found that the lower polymers, at least those containing up to about eight (8) of the above mentioned structural units, are heterocyclic, that is, the units are joined in a ring of siloxane linkages, the ring being composed of alternate silicon and oxygen atoms each silicon having two methyl groups attached thereto. Consequently such lower polymers are completely dehydrated. The cyclic polymers may be distilled, the higher ones preferably under reduced pressure, and having physical properties which vary with the number of units present. These may be tabulated as follows:

*Table I*

| Number of units | °C. boiling pt. | °C. pour pt. | Molecular calc. | Weight found |
|---|---|---|---|---|
| 3 | 135 | 65.5 | 222 | 223 |
| 4 | 170 | 18 | 296 | 290 |
| 5 | 50–75 (4 mm.) | −10 to −15 | 370 | 365 |
| 6 | 75–100 (4 mm.) | −10 to −30 | 444 | 475 |
| 7 | 100–125 (4 mm.) | −95 | 518 | 485 |
| 8 | 125–150 (4 mm.) | −95 | 592 | 610 |

Evidence of higher cyclic polymers has been obtained, but these have not yet been identified. Polymers of the above type do not polymerize in boiling benzene nor, with the exception of the trimer, in hydrochloric acid. Excepting the trimer, they are of low viscosity, all being below 75 Saybolt seconds at 30° C.

The trimer and tetramer shown in the above table were first isolated and identified by James F. Hyde and are described and claimed in his patent application filed of even date herewith.

Polymers higher than those set forth in the above table in general are believed to have a chain structure with terminal hydroxyl groups. These polymers are substantially dehydrated because the proportion of hydroxyl groups is very small and polymerization by condensation can take place to a limited extent only under certain conditions, as will appear. Their molecular weights cannot be accurately stated because molecular weights above 1000 cannot be measured with exactness. The separation of the individual polymers of the chain type is difficult because they decompose below their boiling points, but all attempted separations by means of solvent precipitation have given materials having pour points of −60° to −65° C. Chain polymers of relatively low molecular weight, that is, below about 1000, polymerize with heat and by catalysis, but as the molecular weight increases the ability to polymerize with readiness decreases. At ordinary temperatures they do not polymerize further.

The cyclic polymers, having boiling points below their decomposition points, can vaporize as such and the vapors can be made to flash by application of a flame. Therefore these polymers should be removed from liquid which is to be used at high temperature.

The non-cyclic polymers have boiling points above their decomposition temperature and do not decompose with readiness below 350° C. They show no flash point below this temperature. The flame point is above 350° C., but is difficult to state with precision as the liquid will burn when at high temperature but tends to extinguish itself upon removal of the ignition source.

When petroleum oils are concerned, the relative changes of viscosity with temperature are described numerically as a certain kinematic viscosity index (K. V. I.). The equation for determining this figure is based on the known properties of standard petroleum oils at 210° F. and 100° F. It is strictly valid only when giving an answer between 0 and 125. It takes no account of viscosities below 100° F. The K. V. I. of these silicone liquids lies generally in the neighborhood of 175 to 200, and their useful properties are evident down to −60° C. We prefer to describe the viscosity-temperature coefficient or the change of viscosity with temperature as the slope of the line given by plotting the logarithms of the viscosity $\eta$, as ordinates against the reciprocals of the absolute temperatures as abscissae.

Using such a method of statement, the following table shows the temperature-viscosity relationship for a certain petroleum oil as compared with dimethyl silicone liquids in accordance with our invention. The lower the value of the slope between given temperatures, the smaller the change in viscosity of the material between these temperatures.

Table II

Slopes in terms of $$\frac{\Delta \log \eta}{\Delta 1/T}$$

| Oil sample | 100°–25°C. | 25° to −50° C. | Pour point |
|---|---|---|---|
| | | | °C. |
| "Gulf Pride 40" | 2,218 | (1) | −19 |
| Dimethyl silicone chain polymers | 622 | 766 | −60 |
| Dimethyl silicone cyclic polymers (M. W. 444 and above) | 1,015 | 1,970 | −95 |

1 Infinity.

From Table I it will be seen that the presence of the more volatile and crystalline cyclic polymers detracts from the universal applicability of the dimethyl silicones for lubrication and other purposes because their presence results in waste due to volatilization, a lowering of the flash point and an increase in the pour point. In general, therefore, it is desirable, particularly for use at elevated temperatures, to have the liquid substantially free from the volatile cyclic polymers.

CONTROL OF FLASH POINT AND VISCOSITY

1. The proportion of non-distillable or chain polymers present in the liquid may be varied by modification of the method of hydrolysis. A larger proportion of chain polymers is formed by the use of heat and the presence of solvent, as shown by the following table:

Table III

| Hydrolysis composition, parts by volume | | | Time, hours | Temp. | Per cent weight non-distillable at 150° C. (4 mm.) |
|---|---|---|---|---|---|
| Ester | HCl | Alcohol | | | |
| 300 | 150 | 150 | 20 | 30° C | 33.3 |
| 300 | 150 | | 4 | Reflux | 57.7 |
| 300 | 150 | 150 | 4 | do | 86.3 |

It will be seen that under the most favorable conditions of hydrolysis the resulting product will contain about 15% or more of the distillable cyclic polymers. It has been found that such a distillate contains no trimer but that substantially half of it is the tetramer, the balance being relatively smaller amounts of the other cyclic polymers shown in Table I above.

2. Removal of residual cyclic polymers brings about an increase in the flash point which may or may not be accompanied by an increase in viscosity or polymerization of the chain polymers, depending upon the conditions of the distillation. An increase in the flash point without undue increase in viscosity results from flowing the liquid down the interior of an electrically heated vertical column or tube packed with glass helices against a counter current of inert gas such as nitrogen, carbon dioxide, etc. Atmospheric or reduced pressure may be employed. Under these conditions no substantial polymerization occurs at temperatures as high as 250° C., provided the viscosity of the liquid is initially at least 1000 Saybolt seconds (30° C.) as a result of drying.

For example, a low viscosity liquid having a high flash point was prepared as follows: The usual proportions of hydrolysis mixture,

| | Percent by volume |
|---|---|
| Dimethyl diethoxy silicon | 50 |
| Concentrated HCl | 25 |
| 95% alcohol | 25 | were refluxed. The reflux was stopped at one hour and the product was washed with water. Heating and stirring in a low pressure air stream served to dry and at the same time to remove some low polymers from the liquid. Column treatments served to raise the flash point without excessive increase of viscosity as noted in the following table:

Table IV

| | Column temperature | Viscosity Saybolt sec. at 30° C. | Flash point | Avg. mol wt. after treatment |
|---|---|---|---|---|
| | °C. | | °C. | |
| Liquid after drying | | 212 | 118 | 1,100 |
| First treatment | 185 | 310 | 157 | 1,300 |
| Second treatment | 215 | 310 | 182 | 1,300 |
| Third treatment | 245 | 344 | 244 | 1,500 |

The time exposure of the liquid was about one minute. The column treatments were carried out under reduced pressure (150 mm.) with small amounts of $CO_2$ bled in from dry ice in a Dewar flask.

Instead of the relatively brief column treatment described above the liquid may be held at the desired temperature under reduced pressure and the inert gas bubbled therethrough. This not only raises the flash point but, if continued long enough, also causes a substantial increase in viscosity. For example, a sample having a viscosity of 1190 Saybolt seconds (25° C.) and a flash point of 213° C. was held at a temperature of 210° C. and a pressure of 200 mm. while $CO_2$ was bubbled through it. After two hours the viscosity was 1660 Saybolt seconds (25° C.) and the flash point was 300° C.

3. Flash point and viscosity may also be increased by heating the liquid at a temperature of about 230° C. under atmospheric pressure. However, liquids so treated may thereafter suffer a further gradual change even at normal temperatures. Therefore we have found it desirable in this case, in order to prevent subsequent change, to introduce into the liquid a small amount, say about .1% to 1.0% of an inhibitor or anti-oxidant. For example, when liquid of 1000 Saybolt seconds at 30° C. is heated in air at 230° C. in the presence of inhibitors or anti-oxidants such as p-amino phenol, there is a slow viscosity increase to about 6000 Saybolt seconds at 30° C. Continued exposure to heat for a period of weeks brings about no further appreciable change. But if the liquid is first heated to 230° C. in the absence of inhibitors the viscosity continues to rise at room temperature even after inhibitors are added. Any of the known anti-oxidant inhibitors used with petroleum oils such as p-aminophenol, monobenzyl-p-aminophenol, α naphthol, β naphthol, dibenzyl-p-aminophenol, pyrogallol, etc., are effective to some extent at least and may be used for our purpose. By means of such additions it has been possible to maintain the produce in liquid condition for over six (6) weeks at 230° C. in an open dish.

4. Flash point and viscosity may be increased and further change at room temperature prevented by first heating the liquid in air at about 230° C. as above until the desired viscosity is attained and then washing the cooled product with water. Washing may be accomplished by shaking the liquid with water, allowing the two layers to segregate and separating them by drawing off the water or decanting the top layer. The viscosity of liquids thus treated will not thereafter change at normal temperatures provided they are not subsequently reheated to elevated temperatures. Viscosities ranging from 5000 to 50,000 Saybolt seconds at 30° C. may thus be obtained.

5. Viscosities of the order of 300,000 or more Saybolt seconds at 30° C. may be obtained by treating the liquid with a small amount of anhydrous boric oxide (about 1%-2%) and agitating the liquid while heating it at about 250° C. in an atmosphere of $CO_2$. By this means the rise in viscosity is quite rapid and high values are attained in a relatively short time. Apparently the boric oxide does not combine to any appreciable extent with the liquid because it subsequently settles to the bottom of the container.

Liquids having unusually low pour points and relatively high viscosities can be produced by slightly halogenating cyclic polymers, preferably the tetramer or pentamer, mixing the halogenated cyclic polymer with chain polymers and heating the mixture. The cyclic and chain polymers are obtained by fractional distillation of the dried hydrolysis product as described above. For halogenation it is preferable to use chlorine in the proportions of one to two chlorine atoms per cyclic unit. The reaction proceeds readily by merely passing the requisite amount of chlorine into the polymer to be treated. The chlorine becomes attached to the carbon atom of one or more of the methyl radicles by displacement of hydrogen therefrom. Upon treating the chain polymers with the halogenated cyclic polymer, it is believed that terminal hydroxyl groups of the chain polymers are displaced by cyclic groups and hydrochloric acid is evolved according to the following reaction: The ratio of carbon to silicon remains 2.

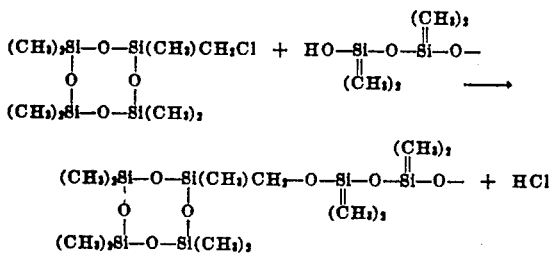

The unusually low pour points resulting from this reaction may be due to the elimination of terminal hydroxyl groups whereby the forces causing orientation of the molecules at low temperatures and consequent reduction of flow characteristics are reduced.

For example, 73.3% by volume of chain polymers obtained by distilling off the cyclic polymers and having an average molecular weight of about 2000, a viscosity of 2250 Saybolt seconds (25° C.) and a pour point of −60° C. was mixed with 26.7% by volume of the cyclic tetramer containing one atom of chlorine for each two silicon atoms. The mixture was refluxed for six hours at 175° C. and then for six hours at 200° C. The product had a viscosity of 3710 Saybolt seconds (25° C.) and a pour point of −70° C.

By employing more highly halogenated cyclic polymers in the above reaction, the viscosity of the product is increased. The use of about 3% of a chlorinated cyclic pentamer containing by analysis five chlorine atoms per silicon atom increased the viscosity of a liquid composed of chain polymers from 1500 to 30,200 Saybolt seconds (25° C.) on heating the mixture for 28 hours at 140° C.

The above described liquids which are produced by our methods, whether of high or low viscosity, are soluble in the common organic solvents. They remain liquid and soluble when heated at 120° C. for four days or more in air.

Uses

Due to their resistance to oxidation these liquids may be used as lubricants at elevated temperatures. As shown above, undue increase in viscosity or polymerization at 230° C. may be greatly delayed, if not altogether prevented. They are particularly adapted for low temperature lubrication on account of their unusually low pour points.

If the liquid is to be used at high temperature, it is preferably prepared so as to contain the maximum proportion of non-distillable polymers (see Table III) and any low boiling cyclic polymers which are formed are removed, as shown above.

If the liquid is to be used at low temperature it is not necessary to remove the low polymers. Normally the amount of polymers having an extremely low pour point is not sufficient to contribute a significant lowering to the pour point of the liquid as a whole. Therefore the liquid becomes solid between −60° C. and −65° C., which is the congealing point of the non-cyclic or chain polymers. A typical product showed a viscosity of 397 Saybolt seconds at 90° C. and 13,754 Saybolt seconds at −60° C. It had no flow at −65° C. The point of no flow (or pour point) may be lowered to −90° C. by distilling off the tetramer, pentamer and hexamer at about 100° C. 4 mm. and adding 14% of the cyclic polymers with pour point −95° C. (heptamer and octamer).

These liquids are useful as hydraulic fluids. Their small change of viscosity with temperature means that small changes of energy suffice to transmit pressure under different temperature conditions. The low pour point and high decomposition point indicates that they are useful over a very wide temperature range. They are also useful as damping media for delicate instruments and for recoil mechanisms or shock absorbing devices not only on account of their low temperature-coefficient of viscosity but because a wide range of viscosities is obtainable.

The difficulty with which these liquids oxidize makes them useful for lubricants in the presence of oxygen. Glass tape impregnated with these products has been held under a pressure of 2000 pounds oxygen and heated to 200° C. The gas was bled back through barium hydroxide solution. No evidence of carbon dioxide formation was obtained nor did the oil in the tape show any sign of physical alteration.

Rubber does not swell, shrink nor become embrittled when in contact with liquid dimethyl silicone for extended periods of time, amounting to as much as a year or more. Consequently, these versatile liquids are adapted to be used in situations wherein common lubricating oils are entirely unsuitable, such as the lubrication of rubber bearings.

The wide range of temperatures over which they remain liquid makes our new products useful as heat transfer media. They may be used as circulating liquids for high or low temperature maintenance, or as the heat transfer media in high or low thermostatic baths.

Measurement of the power factor of liquids prepared according to this invention showed this to be 0.05%. Consequently, such liquids can be used as the fluid filling medium for electrical power transformers.

We claim:

1. The method of preparing liquid polymeric dimethyl silicone which comprises reacting dimethyldiethoxy silicane dissolved in ethyl alcohol with water in the presence of an acid catalyst, said reaction being carried out at the reflux temperature of the mixture and for at least one hour, and then recovering the liquid polymeric dimethyl silicone from the reaction products.

2. The method of preparing liquid polymeric dimethyl silicone which comprises reacting dimethyldiethoxy silicane dissolved in ethyl alcohol with water in the presence of a water soluble acid catalyst, said reaction being carried out at the reflux temperature of the mixture and for at least one hour, washing the reaction product with water to remove the ethyl alcohol and acid catalyst and then dehydrating the liquid which remains.

3. The method of preparing liquid polymeric dimethyl silicone which comprises reacting dimethyldiethoxy silicane dissolved in ethyl alcohol with water in the presence of hydrochloric acid, said reaction being carried out at the reflux temperature of the mixture and for at least one hour, and then recovering the liquid polymeric dimethyl silicone from the reaction products.

4. The method of preparing liquid polymeric dimethyl silicone which comprises mixing approximately one volume of 95% ethyl alcohol, approximately one volume of concentrated aqueous hydrochloric acid and approximately two volumes of dimethyl diethoxy silicane, refluxing the resulting mixture for at least one hour and removing the alcohol and hydrochloric acid from the reaction products and then dehydrating the liquid which remains.

5. The method of preparing liquid polymeric dimethyl silicone which comprises mixing approximately one volume of 95% ethyl alcohol, approximately one volume of concentrated aqueous hydrochloric acid and approximately two volumes of dimethyldiethoxy silicane, refluxing the resulting mixture for from four to eight hours, removing the alcohol and hydrochloric acid from the reaction products and then dehydrating the liquid which remains.

6. The method of preparing liquid polymeric dimethyl silicone which comprises mixing one volume of 95% ethyl alcohol, one volume of concentrated aqueous hydrochloric acid and two volumes of dimethyldiethyoxy silicane, refluxing the resulting mixture for at least one hour, removing the alcohol and hydrochloric acid from the reaction products, and then dehydrating the liquid which remains with heat under reduced pressure.

7. The method of preparing liquid polymeric dimethyl silicone which comprises mixing one volume of 95% ethyl alcohol, one volume of concentrated aqueous hydrochloric acid, and two volumes of dimethyldiethoxy silicane, refluxing the resulting mixture for at least one hour, removing the alcohol and hydrochloric acid from the reaction products and heating the liquid which remains while concurrently bubbling an inert gas therethrough.

8. The method of preparing liquid polymeric dimethyl silicone which comprises mixing one volume of 95% ethyl alcohol, one volume of concentrated aqueous hydrochloric acid and two volumes of dimethyldiethoxy silicane, refluxing the resulting mixture for at least one hour, removing the alcohol and acid from the reaction product, heating the liquid which remains at about 230° C. until a liquid having a viscosity of from 5,000 to 50,000 Saybolt seconds at 30° C. is obtained, cooling said liquid, washing it with water and then removing the water.

ROB ROY McGREGOR.
EARL L. WARRICK.